United States Patent
Konigsburg et al.

(10) Patent No.: US 6,484,230 B1
(45) Date of Patent: Nov. 19, 2002

(54) METHOD AND SYSTEM FOR SPECULATIVELY PROCESSING A LOAD INSTRUCTION BEFORE COMPLETION OF A PRECEDING SYNCHRONIZATION INSTRUCTION

(75) Inventors: Brian R. Konigsburg; Alexander Edward Okpisz; Thomas Albert Petersen; Bruce Joseph Ronchetti, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/161,640

(22) Filed: Sep. 28, 1998

(51) Int. Cl.⁷ .............................................. G06F 13/00
(52) U.S. Cl. ........................................ 711/100; 712/32
(58) Field of Search ........................ 711/100–154, 118, 711/146; 712/28–43, 203–228, 32

(56) References Cited

U.S. PATENT DOCUMENTS

| | | |
|---|---|---|
| 4,317,168 A | 2/1982 | Messina et al. |
| 4,970,643 A | 11/1990 | Cramm |
| 5,295,253 A | 3/1994 | Ducousso et al. |
| 5,454,093 A | 9/1995 | Abdulhafiz et al. |
| 5,625,793 A | 4/1997 | Mirza |
| 5,630,157 A | 5/1997 | Dwyer, III |
| 5,765,208 A * | 6/1998 | Nelson et al. ............... 711/204 |
| 5,848,283 A * | 12/1998 | Moore et al. ................. 712/40 |
| 6,029,204 A * | 2/2000 | Arimilli et al. ............. 709/248 |
| 6,065,086 A * | 5/2000 | Arimilli et al. ............. 710/129 |

* cited by examiner

Primary Examiner—John F. Niebling
Assistant Examiner—Stacy Whitmore
(74) Attorney, Agent, or Firm—Anthony V. S. England; Bracewell & Patterson, L.L.P.

(57) ABSTRACT

A method and system of facilitating storage accesses within a multiprocessor system subsequent to a synchronization instruction by a local processor consists of determining if data for the storage accesses is cacheable and if there is a "hit" in a cache. If both conditions are met, the storage accesses return the data to the local processor. The storage accesses have an entry on an interrupt table which is used to discard the returned data if a snoop kills the line before the synchronization instruction completes. After the cache returns data, a return data bit is set in the interrupt table. A snoop killing the line sets a snooped bit in the interrupt table. Upon completion of the synchronization instruction, any entries in the interrupt table subsequent to the synchronization instruction that have the return data bit and snooped bit set are flushed. The flush occurs because the data returned to the local processor due to a "cacheable hit" subsequent to the synchronization instruction was out of order with the snoop and the processor must flush the data and go back out to the system bus for the new data.

20 Claims, 4 Drawing Sheets

METHOD AND SYSTEM FOR SPECULATIVELY PROCESSING A LOAD INSTRUCTION BEFORE COMPLETION OF A PRECEDING SYNCHRONIZATION INSTRUCTION

BACKGROUND OF THE INVENTION

1. Technical Field

The present invention relates in general to synchronization of processing in multiprocessor systems and in particular to synchronization of bus operations on a multiprocessor system bus. Still more particularly, the present invention relates to an improved method and system for processing a load instruction subsequent to a synchronization instruction.

2. Description of the Related Art

Programmers writing software for execution on multiprocessor data processing systems often need or desire to provide points within the flow of instruction execution serving as processing boundaries, ensuring that all storage accesses within a first code segment are fully executed before any storage accesses within a subsequent code segment are executed. This is particularly true when the multiprocessor system includes superscalar processors supporting out-of-order instruction execution and weak memory consistency. The instruction sets supported by most popular commercial processors include an instruction for setting such a processing boundary. In the PowerPC™ family of processors, for example, the instruction which may be employed by a programmer to establish a processing boundary is the synchronization or "sync" instruction. The sync instruction orders the effects of storage access execution. All storage accesses initiated prior to the sync instruction appear to have completed before the sync instruction completes, and no subsequent storage accesses appear to be initiated until the sync instruction completes. Thus, the sync instruction creates a boundary having two significant effects: first, storage accesses which follow the sync instruction within the instruction stream will not be executed until all storage accesses which precede the sync instruction in the instruction stream have completed. Second, storage accesses following a sync instruction within the instruction stream will not be reordered for out-of-order execution with storage accesses preceding the sync instruction.

With respect to the processor initiating a storage instruction which accesses cacheable data, the sync instruction acts as a barrier for storage accesses after the sync instruction which are not executed until the sync instruction completes. Previous processors deal with the synchronization instruction (sync) by stalling on storage accesses. The disadvantage is the sync instruction completion on the bus takes many processor cycles to complete resulting in the storage instructions backing up behind the sync instruction during the wait delaying the time when cacheable data may be processed. Therefore, storage accesses after the sync instruction start when the sync completes on the bus. After the sync completes on the bus, internal cache arbitration further delays the backed up storage operations.

It would be desirable, therefore, to provide a method and system for processing storage accessing of internal cacheable data initiated after the sync instruction and executed during the sync instruction. It would further be advantageous if the method discarded the internal cacheable data for storage accesses after the sync instruction if a snoop operation kills the line before the sync instruction completes thereby allowing the storage access to flush the data and go back out to the bus for new data.

SUMMARY OF THE INVENTION

It is therefore one object of the present invention to provide an improved method and system for synchronization of processing in multiprocessor systems.

It is another object of the present invention to provide a method and system for processing storage accesses of internal cacheable data initiated after the synchronization instruction and executed during the synchronization instruction.

It is yet another object of the present invention to provide a method and system for storage accesses to flush internal cacheable data that has been returned to the processor subsequent to a synchronization operation while going back out to the bus for new data if a snoop operation kills the line before the synchronization instruction completes.

The foregoing objects are achieved as is now described. The method and system of the present invention for processing storage accesses within a multiprocessor system subsequent to a synchronization instruction by a local processor consists of determining if data for the storage accesses is a "cacheable hit" wherein the storage accesses return the data to the local processor from an internal cache. The storage accesses have an entry on an interrupt table which is used to discard the returned data if a snoop kills the line before the synchronization instruction completes. After the cache returns the data to the processor, a return data bit is set in the interrupt table. A snoop killing the line sets a snooped bit in the interrupt table. Upon completion of the synchronization instruction, any entries in the interrupt table subsequent to the synchronization instruction that have both the return data bit and snooped bit set are flushed. The flush occurs because the data returned to the local processor due to a "cacheable hit" subsequent to the synchronization instruction was out of order with the snoop and the processor must flush the data and go back out to the system bus for the new data. If the processor does not flush the data it would use old data thus violating the architecture.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
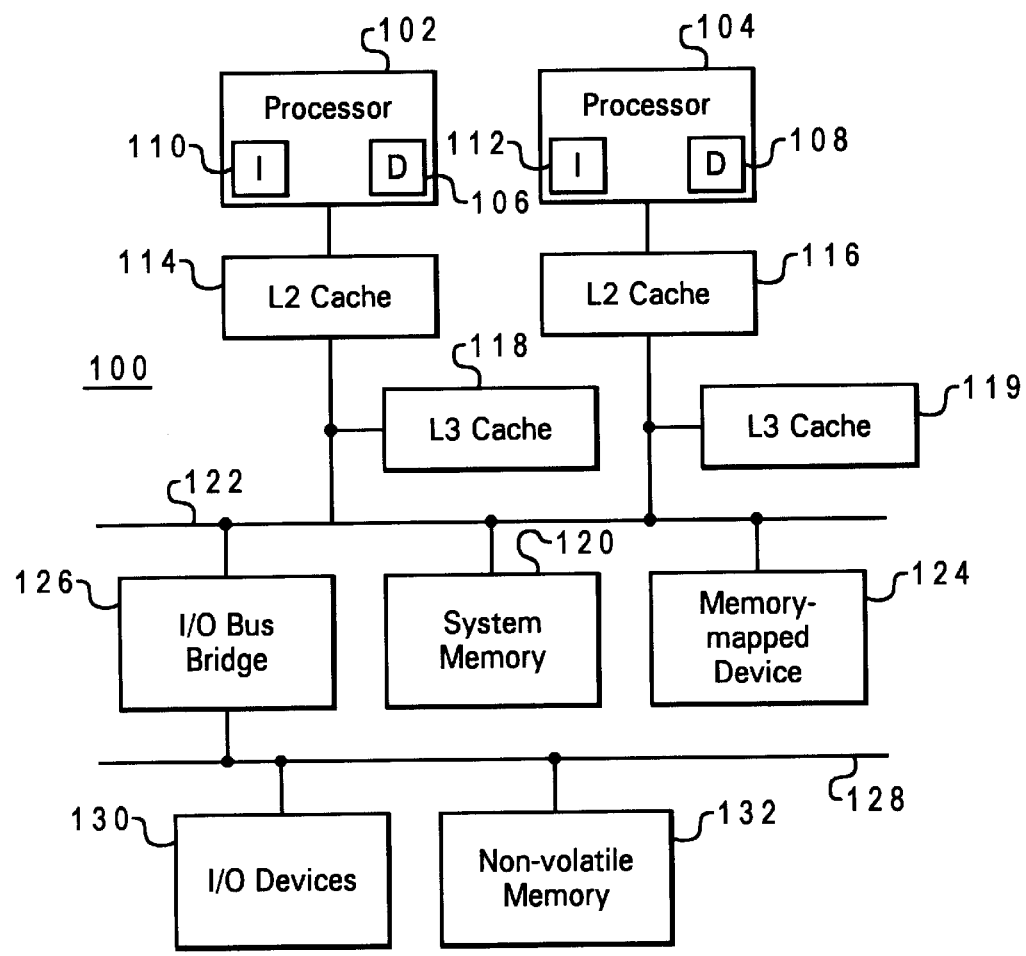
FIG. 1 depicts a multiprocessor data processing system in accordance with a preferred embodiment of the present invention.

With reference now to the figures, and in particular with reference to FIG. 1, a multiprocessor data processing system in accordance with a preferred embodiment of the present invention is depicted. Data processing system 100 is a symmetric multiprocessor (SMP) system including a plurality of processors 102 and 104, which preferably comprise one of the PowerPC™ family of processors available from International Business Machines of Armonk, N.Y. Although only two processors are depicted in the exemplary embodiment, those skilled in the art will appreciate that additional processors may be utilized in a multiprocessor data processing system in accordance with the present invention.

Each processor 102 and 104 includes a level one (L1) data cache 106 and 108, respectively, and an L1 instruction cache 110 and 112, respectively. Although illustrated as bifurcated instruction and data caches in the exemplary embodiment, those skilled in the art will recognize that a single, unified L1 cache may be implemented. In order to minimize data access latency, one or more additional levels of cache memory may be implemented within data processing system 100, such as level two (L2) caches 114 and 116 and level three (L3) caches 118 and 119. The lower cache levels L2 and L3 are employed to stage data to the L1 caches and typically have progressively larger storage capacities but longer access latencies. For example, data caches 106 and 108 and instruction caches 110 and 112 may each have a storage capacity of 32 KB and an access latency of approximately 1–2 processor cycles. L2 caches 114 and 116 might have a storage capacity of 512 KB but an access latency of 5 processor cycles, while L3 caches 118 and 119 may have a storage capacity of 4 MB but an access latency of greater than 15 processor cycles. L2 caches 114 and 116 and L3 caches 118 and 119 thus serve as intermediate storage between processors 102 and 104 and system memory 120, which typically has a much larger storage capacity but may have an access latency of greater than 50 processor cycles.

Both the number of levels in the cache hierarchy and the cache hierarchy configuration employed in data processing system 100 may vary. L2 caches 114 and 116 in the example shown are dedicated caches connected between their respective processors 102 and 104 and system memory 120 (via system bus 122). L3 caches 118 and 119 are depicted as lookaside caches logically vertical with L2 caches 114 and 116. As a result, data or instructions may be looked up in one of L2 caches 114 or 116 and one of L3 caches 118 and 119 simultaneously, although the data or instructions will only be retrieved from L3 cache 118 or 119 if the respective L2 cache 114 or 116 misses while L3 cache 118 or 119 hits. Those skilled in the art will recognize that various permutations of levels and configurations depicted may be implemented.

L2 caches 114 and 116 and L3 caches 118 and 119 are connected to system memory 120 via system bus 122. Also connected to system bus 122 may be a memory mapped device 124, such as a graphics adapter providing a connection for a display (not shown), and input/output (I/O) bus bridge 126. I/O bus bridge 126 couples system bus 122 to I/O bus 128, which may provide connections for I/O devices 130 and nonvolatile memory 132. System bus 122, I/O bus bridge 126, and I/O bus 128 thus form an interconnect coupling the attached devices, for which alternative implementations are known in the art. I/O devices 130 comprise conventional peripheral devices including a keyboard, a graphical pointing device such as a mouse or trackball, a display, and a printer, which are interfaced to I/O bus 128 via conventional adapters. Non-volatile memory 132 may comprise a hard disk drive and stores an operating system and other software controlling operation of system 100, which are loaded into volatile system memory 120 in response to system 100 being powered on. Those skilled in the art will recognize that data processing system 100 may include many additional components not shown in FIG. 1, such as serial and parallel ports, connections to networks or attached devices, a memory controller regulating access to system memory 120, etc. Such modifications and variations are within the spirit and scope of the present invention.

A typical communications transaction on system bus 122 includes a source tag indicating a source of the transaction, an address and/or data. Each device connected to system bus 122 preferably snoops all communication transactions on system bus 122, intervening in communications transactions intended for other recipients when necessary and reproducing changes to system memory data duplicated within the device when feasible and appropriate. In accordance with the present invention, at least the lower level caches within data processing system 100 should preferably always be memory coherent, or else synchronization operations may need to be presented on the system bus in order to allow other caches the opportunity to complete operations.

Figure 2:
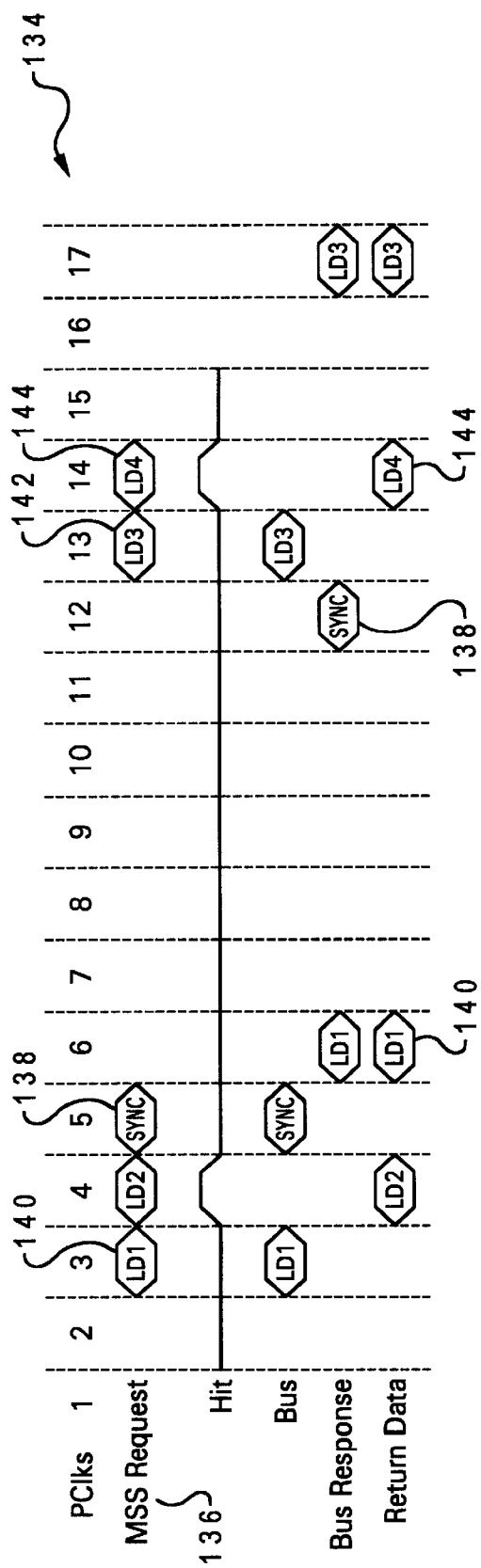
FIG. 2 is a prior art timing diagram of an instruction queue in accordance with the present invention.

Referring now to FIG. 2, a prior art timing diagram 134 of a load instruction queue 136 is illustrated. The load instruction queue 136 is implemented, for example, within L2 cache 114 or 116 and may include a synchronization instruction 138 initiated by either processor 102 or 104 as depicted in FIG. 1. The synchronization instruction 138 orders storage accesses LD1 (load data accesses) 140, LD3 142 and LD4 144 by acting as a barrier as shown in FIG. 2. For storage accesses before the synchronization instruction 138, LD1 140 must be executed before the synchronization instruction 138 completes and releases a processor, 102 or 104 to the system bus 122. For storage accesses after the synchronization instruction 138, LD3 142 and LD 4144 start execution when the synchronization instruction 138 completes and once again releases a processor, 102 or 104 to the system bus 122. It should be noted that previous processors for the PowerPC™ family of devices (602,604), take a simple approach to deal with the synchronization instruction 138 by stalling on storage accesses.

Figure 3:
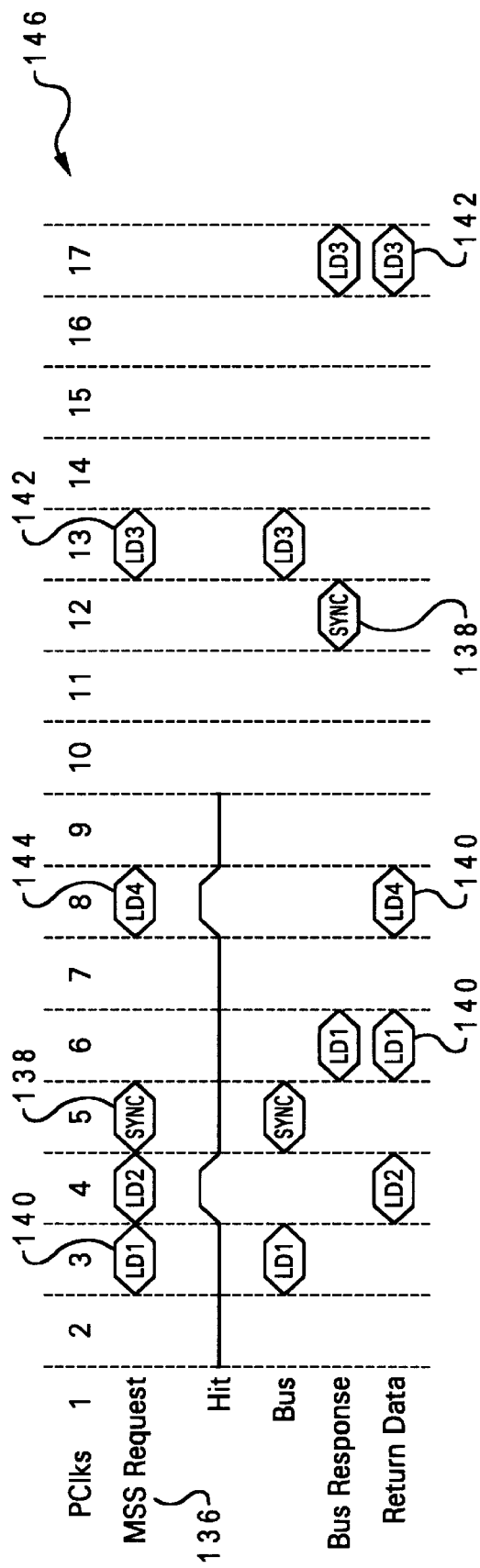
FIG. 3 is a timing diagram of an instruction queue in accordance with a preferred embodiment of the present invention.

Referring now to FIG. 3, there is shown a timing diagram 146 of a load instruction queue 136 in accordance with a preferred embodiment of the present invention. The load instruction queue 136 is implemented once again within L2 cache 114 or 116 and includes the synchronization instruction 138 initiated by either processor 102 or 104 as depicted in FIG. 1. The synchronization instruction 138 once again orders storage accesses LD1 (load data accesses) 140, LD3 142 and LD4 144 as shown in FIG. 3. By way of example, but not of limitation and for illustration purposes solely, LD4 144 contains data that is cacheable for the current processor. As before, for storage accesses before the synchronization instruction 138, LD1 140 must be executed before the synchronization instruction 138 completes and releases a processor, 102 or 104 to the system bus 122. However, in accordance with the present invention, for storage accesses after or subsequent to the synchronization instruction 138, LD4 144 which contains "cacheable," data is returned to processor, 102 or 104, as shown in FIG. 3, and a determination is made if the storage accesses return keeps the data as will be more fully described below.

Figure 4:
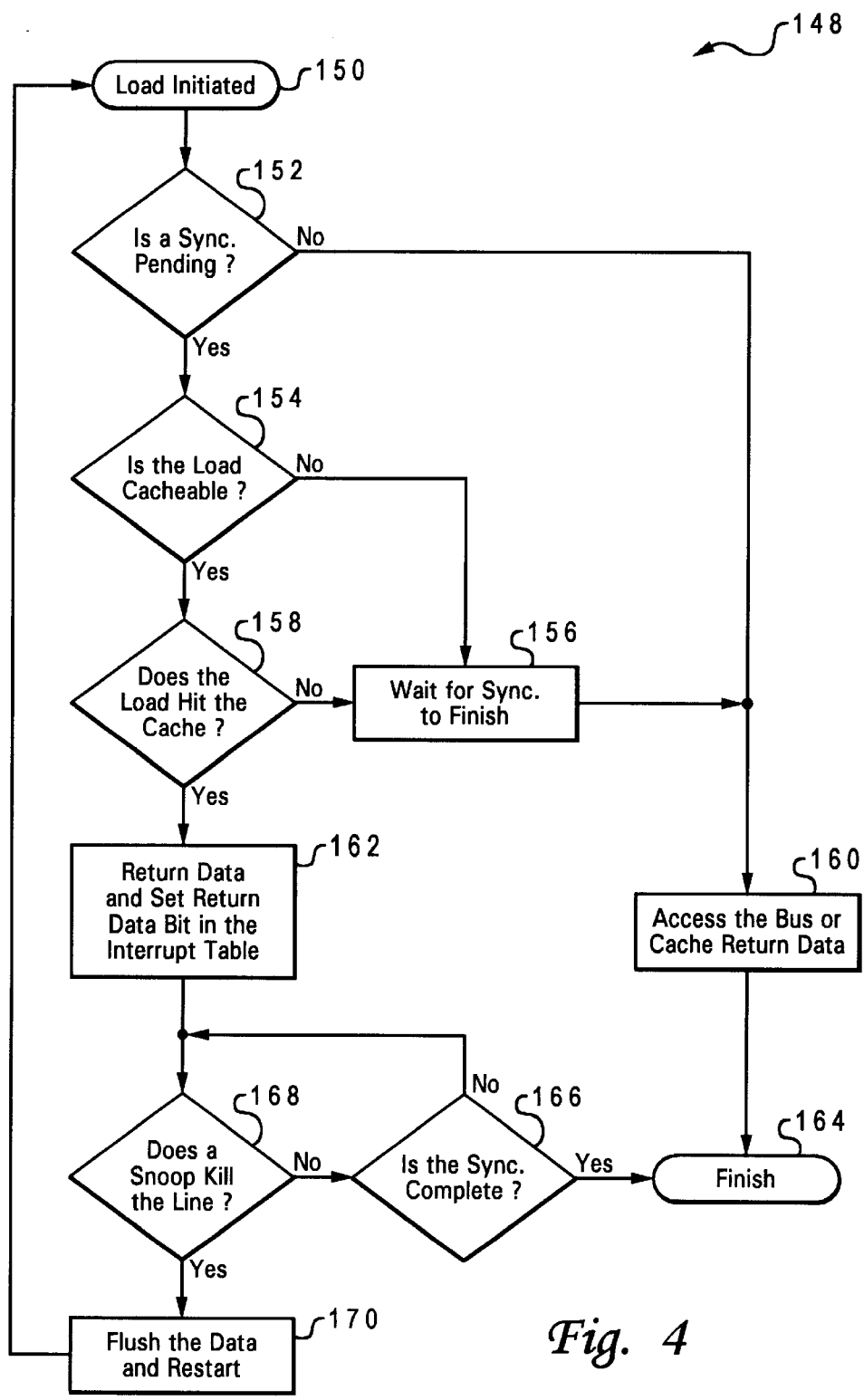
FIG. 4 is a high level flowchart for processing a load instruction subsequent to a synchronization instruction in accordance with a preferred embodiment of the present invention.

With reference now to FIG. 4, a high level flowchart 148 for processing a load instruction LD4 144 subsequent to a synchronization instruction 138 in accordance with a preferred embodiment of the present invention is depicted. The process 148, which for illustration purposes only, may be executed within the lowest level cache and begins at step 150, wherein a load instruction is received or initiated from the local processor 102 depicted in FIG. 1. Next, a determination, illustrated in step 152, is made whether or not a synchronization instruction 138 has been received from the local processor 102 for presentation on the system bus 122 within the multiprocessor system 100 shown in FIG. 1. If it is determined that a synchronization instruction 138 has not been received from the local processor 102, the local processor 102, shown in step 160, accesses the system bus 122, executes the load instruction storage accesses LD4 144 which finishes the process 148 as shown in step 164.

Turning once again to FIG. 4, if in step 152, the synchronization instruction 138 has been received from the local processor 102 for presentation on the system bus 122, the process 148 continues to step 154. In Step 154 a determination is made if the storage accesses or load instruction LD4 144 is cacheable thereby allowing the L2 cache 114 to return data to the local processor 102 subsequent to the synchronization instruction 138. This determination, in accordance with one preferred embodiment of the present invention in the PowerPC™ family of devices is based on a status of a plurality of write-through/write-back (W), cache-inhibited (I), and memory coherency (M) attributes, more commonly referred to as "WIM" bits. If in step 154, it is determined that the L2 cache 114 may not return the data to the local processor 102 based on the status of the plurality of WIM bits (load instruction 144 is non-cacheable), then proceed to step 156 and wait for the synchronization instruction 138 to complete. After the synchronization instruction 138 has completed, the local processor 102, shown in step 160, accesses the system bus 122, executes the load instruction storage accesses LD4 144 which finishes the process 148 once again as shown in step 164.

Referring once again to FIG. 4, if in Step 154 a determination is made based on the status of the plurality of WIM bits that the storage accesses or load instruction LD4 144 is cacheable a further determination, shown in the next step 158, is whether a "hit" has occurred on the data present in the on chip cache 114 thereby allowing the on chip cache 114 to return data to the local processor 102 subsequent to the synchronization instruction 138. If the data is not present in the on chip cache 114 wherein a "miss" has occurred, then proceed to step 156 and wait for the synchronization instruction 138 to complete. After the synchronization instruction 138 has completed, the local processor 102, shown in step 160, accesses the system bus 122, executes the load instruction storage accesses LD4 144 which finishes the process 148 as shown in step 164.

If both conditions are met, that is if the data for the storage accesses is cacheable and if there is a "hit" in the cache, the storage accesses return the data to the local processor 102 and sets a data bit in an interrupt table, not shown, for presentation on the system bus within the multiprocessor system 100, as shown in step 162. The process 148 then proceeds to step 168 wherein the entry on the interrupt table is used to discard the returned data if it is determined that a snoop kills the line before the synchronization instruction 138 completes. A snoop killing the line sets a snooped bit, not shown, in the interrupt table. As shown in step 166, upon completion of the synchronization instruction 138, any entries in the interrupt table subsequent to the synchronization instruction 138 that have the return data bit and snooped bit set are flushed, shown in step 170. The flush occurs because the data returned to the local processor 102 due to a "cacheable hit" subsequent to the synchronization instruction 138 was out of order with the snoop and the processor must flush the data and go back out to the system bus 122 for the new data.

The present invention provides a means for processing storage accessing of internal cacheable data initiated after the synchronization instruction and executed during the synchronization instruction. Therefore, data in the caches is not delayed for the rare chance that a snoop might beat the synchronization instruction completion on the system bus. While the invention has been particularly shown and described with reference to a preferred embodiment, it will be understood by those skilled in the art that various changes in form and detail may be made therein without departing from the spirit and scope of the invention.

What is claimed is:

1. A method of operating a multiprocessor data processing system, said method comprising:

in response to receiving a storage access request from a local processor, determining whether said storage access request is subsequent to a synchronization operation received from said local processor that has not completed; and in response to determining that said storage access request is subsequent to a synchronization operation from the local processor that has not completed, speculatively performing a storage access specified by the storage access request to a cacheable data block specified by the storage access request prior to completion of the synchronization operation; and thereafter, in response to snooping an invalidating operation by a remote processor prior to the synchronization operation completing, wherein said invalidating operation invalidates the data block targeted by the storage access, discarding results of said data access and again performing said data access specified by the storage access request.

2. The method of claim 1, wherein said step of speculatively performing said storage access is performed only if said data block is cacheable.

3. The method of claim 2, and further comprising:

if said data block is non-cacheable, waiting for said synchronization operation to complete before performing said storage access.

4. The method of claim 2, wherein said step of speculatively performing said storage access is performed only if said data block is resident in data storage local to said local processor.

5. The method of claim 4, and further comprising:

if said data is not resident in data storage local to said local processor, waiting for said synchronization operation to complete before performing said storage access.

6. The method of claim 1, and further comprising:

indicating that said storage access has been performed speculatively by setting a data bit in an interrupt table.

7. The method of claim 1, further comprising:

if said synchronization operation completes without snooping an invalidating operation that invalidates said data block retaining said results of said storage access.

8. A storage system for a local processor within a multiprocessor system, said storage system comprising:

means, responsive to receiving a storage access request from the local processor, for determining if said storage access request is subsequent to a synchronization operation received from said local processor that has not completed;

means, responsive to determining that said storage access request is subsequent to a synchronization operation from the local processor that has not completed, for speculatively performing a storage access specified by the storage access request to a cacheable data block specified by the storage access request prior to completion of the synchronization operation; and means, responsive to snooping an invalidating operation by a remote processor prior to the synchronization operation completing, wherein said invalidating operation invalidates the data block targeted by the storage access, for discarding results of said data access and again performing said data access specified by the storage access request.

9. The system of claim 8, wherein said means for speculatively performing said storage access speculatively performs said storage access only if said data block is cacheable.

10. The system of claim 9, further comprising:

means for performing said storage access non-speculatively if said data block is not cacheable.

11. The system of claim 9, wherein said means for speculatively performing said data access speculatively performs said data access only if said data block is resident in said storage system local to said local processor.

12. The system of claim 11, further comprising:

means for performing said storage access non-speculatively if said data block is not resident within said storage system local to said local processor.

13. The system of claim 8, and further comprising:

means, responsive to said synchronization instruction completing without said storage system snooping an invalidating operation targeting said data block, for retaining said results of said speculative storage access.

14. The system of claim 8, wherein said storage system comprises a multi-level cache hierarchy.

15. A data processing system, comprising:

a local processor and a remote processor coupled to an interconnect for communication, wherein each of said local processor and said remote processor has a respective storage subsystem, wherein said storage system comprises:

data storage;

means, responsive to receiving a storage access request from the local processor, for determining if said storage access request is subsequent to a synchronization operation received from said local processor that has not completed;

means, responsive to determining that said storage access request is subsequent to a synchronization operation from the local processor that has not completed, for speculatively performing a storage access specified by the storage access request to a cacheable data block within the data storage specified by the storage access request prior to completion of the synchronization operation; and means, responsive to snooping an invalidating operation by a remote processor prior to the synchronization operation completing, wherein said invalidating operation invalidates the data block targeted by the storage access, for discarding results of said data access and again performing said data access specified by the storage access request.

16. The data processing system of claim 15, wherein said means for speculatively performing said storage access speculatively performs said storage access only if said data block is cacheable.

17. The data processing system of claim 16, further comprising:

means for performing said storage access non-speculatively if said data block is not cacheable.

18. The data processing system of claim 16, wherein said means for speculatively performing said data access speculatively performs said data access only if said data block is resident in said storage system local to said local processor.

19. The data processing system of claim 18, further comprising:

means for performing said storage access non-speculatively if said data block is not resident within said storage system local to said local processor.

20. The data processing system of claim 15, and further comprising:

means, responsive to said synchronization instruction completing without said storage system snooping an invalidating operation targeting said data block, for retaining said results of said speculative storage access.

* * * * *